March 20, 1945.   C. C. BAILEY   2,372,049
EMERGENCY VEHICLE WHEEL
Filed July 14, 1944   2 Sheets-Sheet 1

Inventor

CLIFTON C. BAILEY,

By *Clarence A. O'Brien*
and *Harvey B. Jacobson*
Attorneys

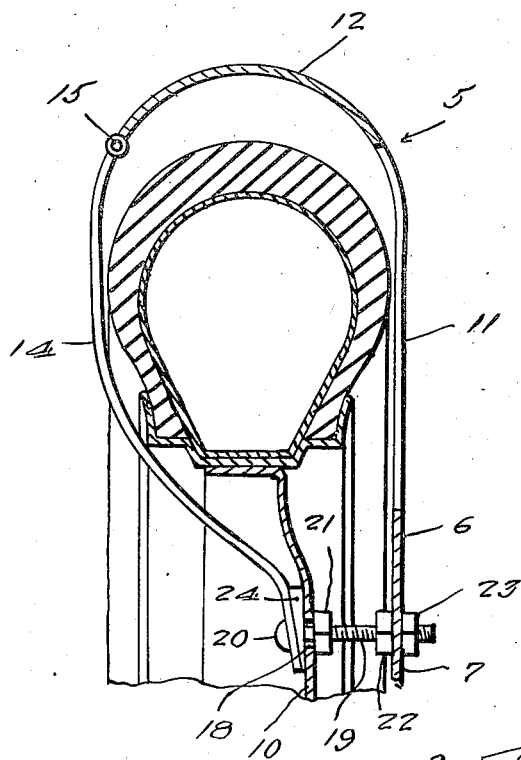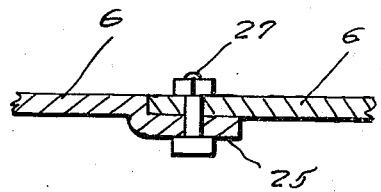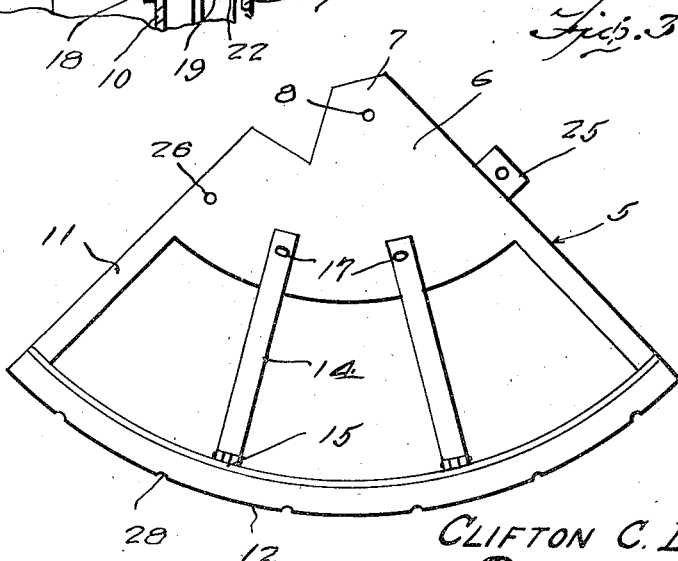

Patented Mar. 20, 1945

2,372,049

UNITED STATES PATENT OFFICE 2,372,049

EMERGENCY VEHICLE WHEEL

Clifton C. Bailey, Ashland, Ohio

Application July 14, 1944, Serial No. 544,840

3 Claims. (Cl. 301—38)

The present invention relates to new and useful improvements in emergency wheels for automobiles and other vehicles adapted for attaching to a conventional type of automobile wheel to provide an auxiliary tread to support the vehicle should the tire become flat, and thus enable the vehicle to be driven to a garage without damage to the tire and without necessitating road repairs thereto.

An important object of the present invention is to provide an emergency wheel of this character formed of a plurality of segments adapted for mounting individually on the vehicle wheel without necessitating the use of a jack for raising the vehicle and also embodying means for rigidly connecting the segments in assembled position on the wheel.

A still further object is to provide a device of this character of simple and practical construction, which is strong and durable, efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 2 is a fragmentary sectional view taken substantially on a line 2—2 of Figure 1.

Figure 3 is a view in elevation of the inside of one of the segments of the emergency wheel, and Figure 4 is a fragmentary sectional view taken substantially on a line 4—4 of Figure 1.

Figure 1:
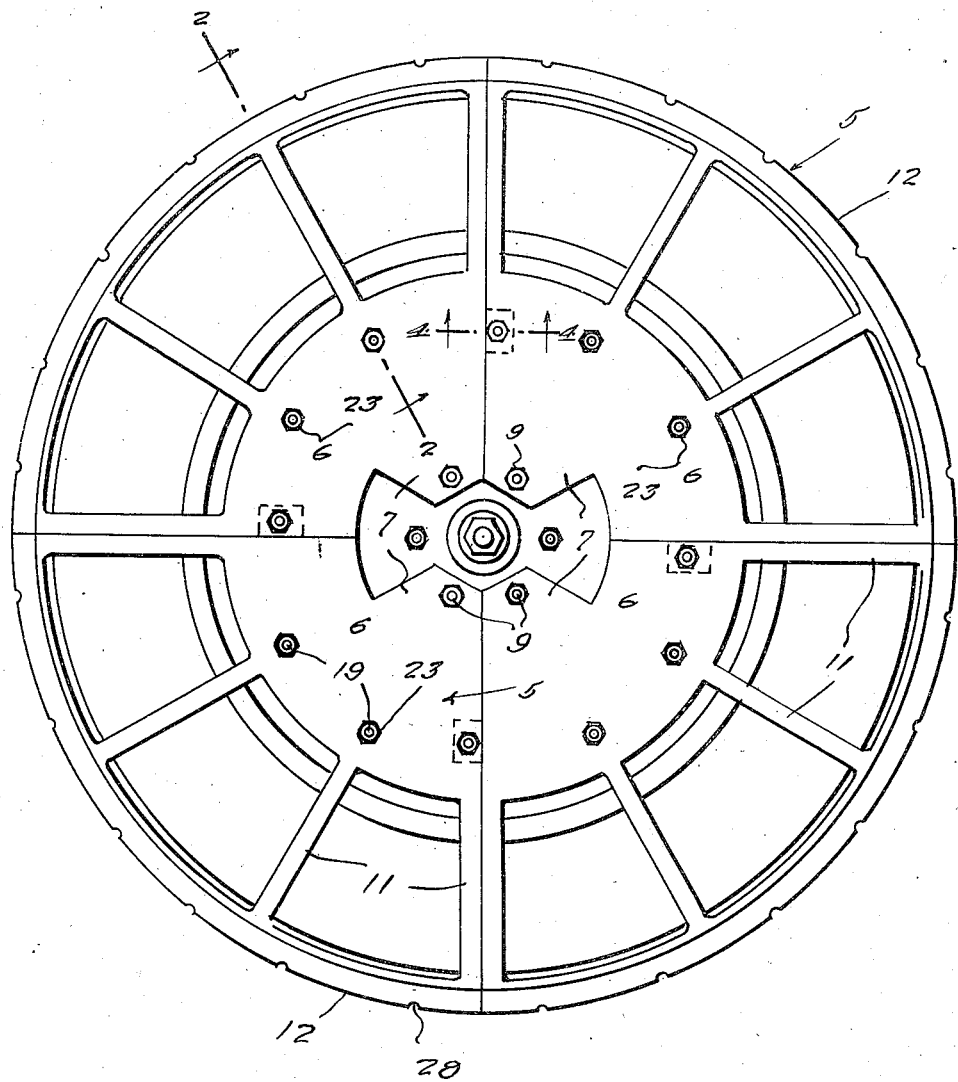
Figure 1 is a side elevational view showing the emergency wheel mounted in position on the vehicle wheel.

Referring now to the drawings in detail wherein for the purpose of illustration I have disclosed a preferred embodiment of the invention, the numeral 5 designates one of the emergency wheel segments generally and which includes a plate portion 6 having a tongue 7 formed on its inner edge provided with an opening 8 adapted for receiving one of the bolts 9 employed for attaching the usual vehicle wheel 10 on the automobile, truck or other motor-driven vehicles.

Projecting radially from the outer edge of the plate 6 is a plurality of spokes 11 connected at their outer ends by an arcuate tread section 12 curved transversely to conform to the tread of the automobile tire 13 and disposed in spaced relation therefrom.

A plurality of spokes 14 are connected to the inner edge of the tread member 12 by means of hinge members 15, the spokes 14 extending radially inwardly from the tread member 12 toward the plate 6 and have their inner ends curved toward the wheel 10 as shown to advantage in Figure 2 of the drawings.

The plate 6 and the inner ends of the spokes 14 are formed with aligned openings 16 and 17, the opening 17 being elongated in a direction transversely with respect to the spokes and the wheel 10 is likewise usually formed with openings 18 through which a bolt 19 is inserted, the bolt including a head 20 having opposite edges flattened and adapted for insertion through the opening 17 and by a quarter turn of the bolt to position the head 20 transversely of the opening 17 to prevent removal of the bolt from the spokes 14. The bolt is provided with a nut 21 threaded thereon to clamp the spokes 14 against the wheel 10 and the bolt is also provided with nuts 22 and 23 threaded thereon for securing the bolt to the plate 6. Any suitable means may be provided to prevent turning of bolt 19 when the latter is tightened with its head disposed transversely of opening 17.

A wedge-shaped washer 24 is interposed between the spokes 14 and the adjacent side of the wheel 10 to take up the space between the spokes and the side of the wheel.

One edge of the plate 6 is formed with an apertured lug 24 offset from the plane of the plate as shown to advantage in Figure 4 of the drawings, while the opposite edge of the plate 6 is formed with an opening 26. Accordingly, the edge of an adjacent segment may be placed against the lug 25 with the opening 26 aligned with the opening of the lug and adapted for receiving a bolt 27 to secure the segments in assembled relation or extending entirely around the tire of the wheel.

The outer surface of the tread portion 12 is formed with openings 28 adapted for detachably receiving tire cleats or lugs (not shown) of suitable construction and adapted to facilitate the traveling of the emergency wheel through mud.

From the foregoing it will be apparent that the segments 5 may be individually placed in position on the vehicle wheel and then connected together to form a complete emergency wheel without necessitating the jacking of the vehicle.

It is believed that the details of construction and manner of use of the device will be readily understood from the foregoing without further detailed explanation.

Having described the invention, what I claim is:

1. An emergency vehicle wheel comprising a plurality of wheel segments, each of said segments including a tread portion, and inner and outer spokes, said inner spokes being hingedly connected to said tread portion, means connecting the segments together in assembled relation and adapted for positioning on a regular vehicle wheel and attached thereto, and means connecting the spokes to the opposite surfaces of said regular wheel.

2. An emergency vehicle wheel comprising a plurality of wheel segments, each of said segments including a tread portion, and inner and outer spokes, said inner spokes being hingedly connected to said tread portion, means connecting the segments together in assembled relation and adapted for positioning on a regular vehicle wheel and attaching plate connecting the outer spokes and adapted for attaching to said regular wheel at the hub portion of the latter, and means connecting the spokes at the opposite surfaces of said regular wheel.

3. An emergency vehicle wheel comprising a plurality of wheel segments, each of said segments including a tread portion, and inner and outer spokes, said inner spokes being hingedly connected to said tread portion, means connecting the segments together in assembled relation and adapted for positioning on a regular vehicle wheel and attaching plate connecting the outer spokes and adapted for attaching to said regular wheel at the hub portion of the latter, and bolts inserted through the regular wheel and connecting the inner and outer spokes thereto.

CLIFTON C. BAILEY.